US006951050B2

(12) United States Patent
Maraszewski et al.

(10) Patent No.: US 6,951,050 B2
(45) Date of Patent: Oct. 4, 2005

(54) PROCESS AND APPARATUS FOR RECOVERING MATERIALS FROM INSTALLATION CABLES WITH A BUNCHED CONDUCTOR

(76) Inventors: Jan Maraszewski, Mordarka 415, 34-600 Limanowa (PL); Witold Maraszewski, Mordarka 415, 34-600 Limanowa (PL); Kazimierz Plata, Wysokie 26, 34-600 Limanowa (PL); Bronislaw Plata, Wysokie 26, 34-600 Limanowa (PL)

( * ) Notice: Subject to any disclaimer, the term of this patent is extended or adjusted under 35 U.S.C. 154(b) by 0 days.

(21) Appl. No.: 10/470,025

(22) PCT Filed: Jan. 22, 2002

(86) PCT No.: PCT/PL02/00003

§ 371 (c)(1),
(2), (4) Date: Nov. 10, 2003

(87) PCT Pub. No.: WO02/058082

PCT Pub. Date: Jul. 25, 2002

(65) Prior Publication Data
US 2004/0060158 A1 Apr. 1, 2004

(30) Foreign Application Priority Data
Jan. 22, 2001 (PL) ..................... 345370

(51) Int. Cl.[7] ................. B23P 19/04; B02B 1/08
(52) U.S. Cl. ........... 29/403.4; 29/403.3; 241/24.15; 241/66; 241/263; 241/264
(58) Field of Search ............... 29/403.3, 403.1, 29/403.2, 403.4, 426.4, 426.3; 156/344; 241/24.13, 241/24.15, 24.25, 66, 263, 201, 264

(56) References Cited

U.S. PATENT DOCUMENTS 3,342,638 A    9/1967  Wanzenberg ............ 134/9
3,612,412 A *  10/1971 Graveman ............... 241/25
4,964,577 A *  10/1990 Kopp .................. 241/24.15

FOREIGN PATENT DOCUMENTS

GB    2070623    9/1981

* cited by examiner

Primary Examiner—Marc Jimenez
(74) Attorney, Agent, or Firm—Ladas & Parry LLP

(57) ABSTRACT

A process and apparatus for recovering conductor material from an installation cable with bunched conductors and plastic insulation cuts the installation cable into segments, presses and rolls the segments at an increased temperature ranging from 70° to 130° C. with the longitudinal axes of the segments perpendicular to directions of the rolling and sieves the segments for separating conductor material from the segments and, thereby, recovering the conductor material.

5 Claims, 1 Drawing Sheet

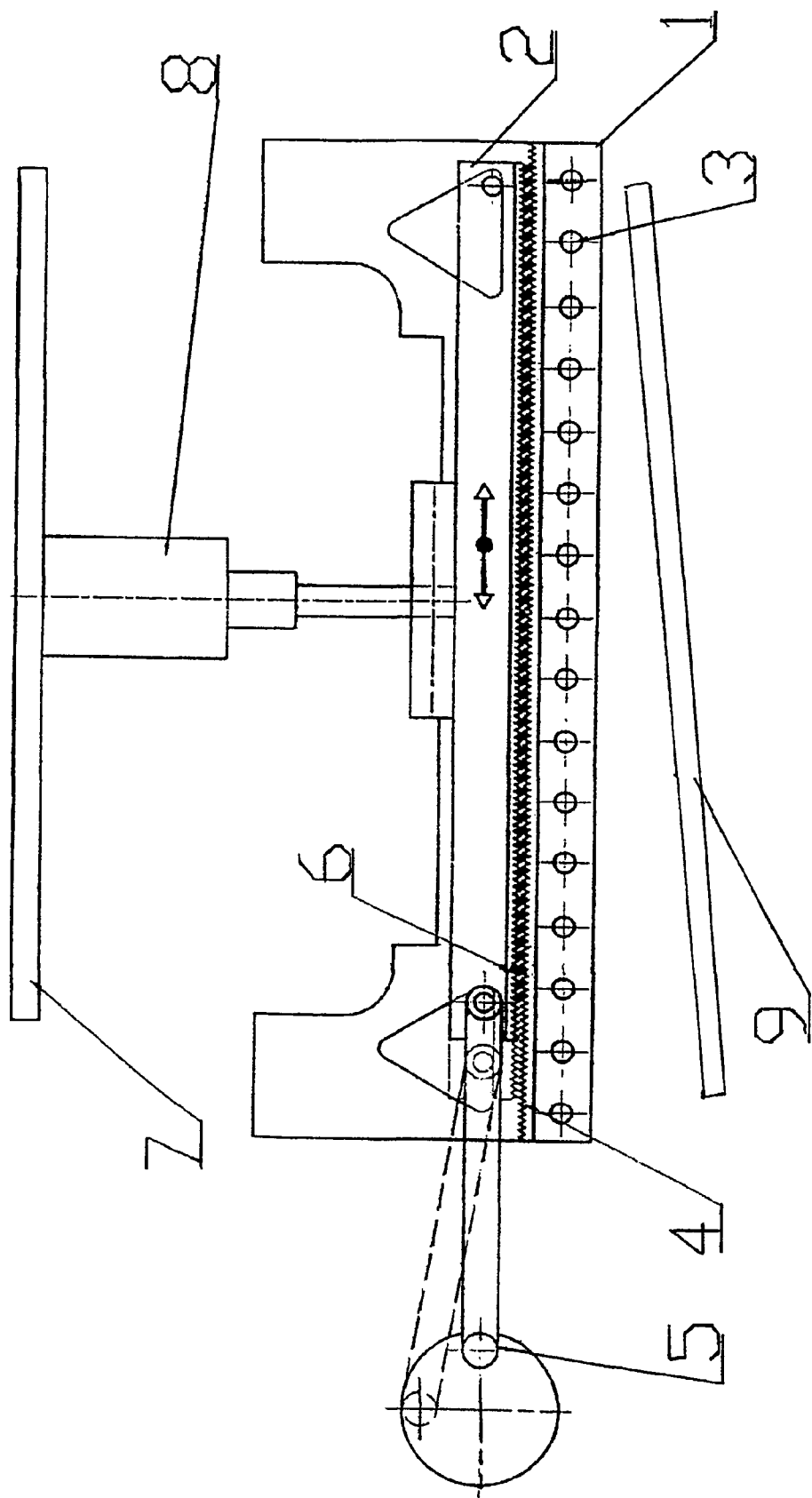

PROCESS AND APPARATUS FOR RECOVERING MATERIALS FROM INSTALLATION CABLES WITH A BUNCHED CONDUCTOR

BACKGROUND OF THE INVENTION

The present invention relates to a process for recovering materials from single-core installation cables, the core being made of non-magnetic material and plastic insulation. The present invention relates further to a construction of an apparatus desired for implementing the process.

It is known a Swedish process for recovering copper from cables with plastic insulation, comprising grinding the whole conductor, followed by separation of a product obtained in a separator. Copper obtained by this process as a powder allows to recover up to 60% copper brought to the recovery process.

Other process known inter alia from the Polish application of the utility model No 91974 consists in separation of the insulation from metal conductors by means of a knife arranged in a groove of the guide roll. In addition there is a scraper mounted at the roll. The knife is arranged at a pin through the torsional arm coupled with a control mechanism. The process is not suitable for bunched installation conductors due to easy damage of a core.

SUMMARY OF THE INVENTION

It is the object of the present invention to provide a process for recovering materials from installation cables with a bunched conductor, with recovery ratio which exceeds results obtained till now, as well as an apparatus for carrying out the process.

The process for recovering materials from installation cables with a bunched conductor consists in cutting the installation cable into segments and, after holding down, rolling them at an increased temperature ranging from 70° to 130° C. while maintaining, during rolling, a segment arrangement perpendicular to the movement direction, followed by separation of the recovered segments from non-separated cable segments, which are again subjected to the recovery process.

It is preferred to roll the segments of the installation cable between elements with an increased coefficient of friction.

The apparatus for recovering materials from installation cables with a bunched conductor and plastic insulation, provided with a separating sieve, presents segments comprising a lower plate and an upper plate associated with a mechanism to impart a reciprocating motion, as well as a pressure servo-motor, and a separating sieve arranged under it in an angular manner, the segments being connected each other with a frame.

It is preferred to provide the lower plate with a heating element as well as to make on its upper surface cross notches.

It is also preferred to make on the lower surface of the upper plate notches in form of grooves in the direction perpendicular to its direction.

It is also preferred to provide a mechanism as a connecting-rod system to impart a reciprocating motion.

Providing a new process for recovering materials from installation cables with bunched conductors has increased recovery of metal to more than 90%. Metal obtained by this method is of technical purity and suitable to reprocessing with no additional measures. The insulation obtained by this technology is also an intermediate product for reprocessing.

BRIEF DESCRIPTION OF THE DRAWING

The apparatus for recovering materials from installation cables is illustrated in the drawing in a side view.

DESCRIPTION OF EMBODIMENTS

Implementation of the inventive process begins with cutting the installation cable into segments. Subsequently, the segments are thrown into a movable drawer provided with a bottom that can be opened. The drawer thus prepared is inserted into the apparatus for recovering, wherein the drawer bottom is opened over a lower plate 1, and the cable segments are dumped onto an exactly limited surface of the plate. After removing the drawer an upper plate 2 is pressed down and put in a to-and-fro motion to roll the segments at an increased temperature ranging from 70° to 130° C. that increases the coefficient of friction between the plates. Both factors give rise to thermal expansion of the insulation, and an appropriate pressing down of the upper plate makes it possible to execute a complex motion by the cable segments during which the bunched conductors fall out of then horizontally arranged segments. The next operation consists in raising the upper plate and shifting a scraper which displaces separated conductors, insulations and non-separated segments to a sieve that separates conductors from non-separated parts and insulation.

The apparatus for recovering materials from the cables presents a lower plate 1 and upper plate 2, which accomplish a translatory motion with respect to each other. In the lower plate there is provided a heating element 3, whereas on its upper surface 4 cross notches, are made.

The upper plate 2 is associated with a connecting-rod mechanism 5. On the lower surface of the upper plate 2, there are groove notches in the direction perpendicular to that of the reciprocating motion, and the pressing servo-motor 8 is fixed to the frame 7 over the upper plate 2.

Under the lower plate 1 there is arranged in an angular manner the separating sieve 9, through which separated and non-separated cable segments are displaced.

What is claimed is:

1. In a process for recovering conductor materials from an installation cables with bunched conductors and plastic insulation, the improvements comprising:
   cutting the installation cable segments;
   pressing and rolling the segments at an increased temperature ranging from 70° to 130° C. with the longitudinal axes of the segments perpendicular to direction of the rolling; and
   sieving for separating conductor material from the segments and, thereby recovering the conductor material.

2. Process according to claim 1, characterised in that the rolling of installation cable segments occurs between elements of an increased coefficient of friction.

3. In an apparatus for recovering conductor material from an installation cable with bunched conductors and plastic insulation, the improvements comprising
   a lower plate and an upper plate for relative reciprocating motion and pressure between them on segments of the installation cable at temperatures of from 70° to 130° C. for separating and, thereby, recovering conductor material therefrom, characterised in that the lower plate is provided with a heating element, and has on its upper surface cross notches. notches.

4. Apparatus according to claim 3, characterised in that the upper plate is movable in a direction and has on its lower surface groove notches perpendicular to the direction.

5. In an apparatus for recovering conductor material from an installation cable with bunched conductors and plastic insulation, the improvements comprising a lower plate and an upper plate for relative reciprocating motion and pressure between them on segments of the installation cable at temperatures of from 70° to 130° C. for separating and, thereby, recovering conductor material therefrom, characterised in that the upper plate is movable in a direction and has on its lower surface groove notches perpendicular to the direction.

* * * * *